US006441070B1

(12) United States Patent
Halasa et al.

(10) Patent No.: US 6,441,070 B1
(45) Date of Patent: Aug. 27, 2002

(54) RUBBER COMPOSITIONS CONTAINING A TRIVALENT PHOSPHOROUS COMPOUND-SILICA COMPLEX

(75) Inventors: Adel Farhan Halasa, Bath; David John Zanzig, Uniontown; Robert Charles Hirst, Akron, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/616,191

(22) Filed: Jul. 14, 2000

(51) Int. Cl.[7] .............................. C08K 3/36; C08K 5/50; C08K 5/52; C08K 5/5398; C08L 7/00; C08L 9/00; C08L 9/02; C08L 9/06; C08L 33/12; C08L 19/00; B60C 11/00

(52) U.S. Cl. ...................... 524/128; 524/146; 524/154; 524/492; 524/548; 524/560; 524/571; 524/574; 524/575.5; 152/209.1

(58) Field of Search ................... 524/128, 154, 524/146, 492, 548, 556, 560, 571, 574, 575.5; 152/209.1

(56) References Cited

U.S. PATENT DOCUMENTS

| | | | | |
|---|---|---|---|---|
| 3,888,752 A | * | 6/1975 | Eldred .......................... | 522/76 |
| 4,152,347 A | * | 5/1979 | Pletka et al. ................. | 556/405 |
| 4,234,636 A | * | 11/1980 | Thorsrud et al. .............. | 428/95 |
| 4,374,943 A | | 2/1983 | Williams ..................... | 523/211 |
| 5,023,287 A | * | 6/1991 | Evans et al. ................. | 524/255 |
| 5,246,778 A | * | 9/1993 | Costemalle et al. ......... | 428/398 |
| 5,424,104 A | * | 6/1995 | Amimoto et al. ........... | 428/36.8 |
| 5,641,820 A | * | 6/1997 | Wideman et al. ........... | 524/225 |
| 5,703,258 A | | 12/1997 | Blount ........................ | 556/404 |
| 5,817,719 A | | 10/1998 | Zanzig et al. ................ | 125/212 |
| 5,910,544 A | | 6/1999 | Ozawa et al. ................ | 525/178 |
| 5,919,875 A | | 7/1999 | Luo et al. .................... | 526/139 |
| 5,961,943 A | | 10/1999 | Komatsu et al. ........... | 423/328.2 |
| 6,009,910 A | | 1/2000 | Shibano ..................... | 138/126 |
| 6,015,525 A | | 1/2000 | Patitsas et al. .............. | 264/315 |
| 6,017,985 A | * | 1/2000 | Kang et al. ................. | 524/263 |
| 6,060,552 A | | 5/2000 | Kaido ........................ | 524/492 |
| 6,174,951 B1 | * | 1/2001 | Scholl ........................ | 524/492 |

FOREIGN PATENT DOCUMENTS

| | | |
|---|---|---|
| DE | 19717091 | 4/1997 |
| EP | 1103576 | 5/2001 |

* cited by examiner

Primary Examiner—Vasu Jagannathan
Assistant Examiner—Callie E Shosho
(74) Attorney, Agent, or Firm—Bruce J. Hendricks; John D. DeLong

(57) ABSTRACT

The present invention relates to rubber compositions containing an elastomer and a trivalent phosphorous compound-silica complex.

16 Claims, No Drawings

RUBBER COMPOSITIONS CONTAINING A TRIVALENT PHOSPHOROUS COMPOUND-SILICA COMPLEX

FIELD OF THE INVENTION

The present invention relates to a rubber composition containing an elastomer and a trivalent phosphorous compound-silica complex.

BACKGROUND OF THE INVENTION

Organosilicon compounds having ethoxy groups are commonly used in silica-filled natural and synthetic rubber compositions. Unfortunately, during the thermal mixing of such processing compositions, ethanol is released. Whereas use of organosilicon compounds benefits the properties of the silica-filled rubber, it is desired to achieve similar properties without the undesirable evolution of ethanol.

SUMMARY OF THE INVENTION

The present invention relates to the use of a trivalent phosphorous compound-silica complex in a mixture with an elastomer.

DETAILED DESCRIPTION OF THE INVENTION

There is disclosed a method for processing a rubber composition which comprises mixing
(i) 100 parts by weight of at least one elastomer; with
(ii) 1 to 150 phr of a trivalent phosphorous compound-silica complex.

There is also disclosed a rubber composition comprising an intimate mixture of
(i) 100 parts by weight of at least one elastomer; and
(ii) from 1 to 150 phr of a trivalent phosphorous compound-silica complex.

The present invention may be used to process rubbers or elastomers containing olefinic unsaturation. The phrase "rubber or elastomer" is intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers containing olefinic unsaturation are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. The preferred rubber or elastomers are polybutadiene and SBR.

In one aspect the rubber is preferably a mixture of two rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent. A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

In addition to the above elastomers, halogenated copolymers of isobutylene and p-methyl styrene may be used. Typically, such copolymers have a ratio of isobutylene to p-methyl styrene in a range of about 50/1 to 7/1.

In practice, the halogenated copolymer may, for example, first be prepared by copolymerizing isobutylene and p-methyl styrene. Then the copolymer may be halogenated with a halogen, such as with bromine by bromination of the isobutylene/p-methyl styrene copolymer which occurs at the paramethyl position, yielding a benzyl bromide functionality. The degree of bromination can be typically varied from about 0.5 weight percent to about 2.5 weight percent bromine, based on the copolymer of isobutylene and p-methyl styrene. For the tire tread applications, it is considered herein that about 1.5 weight percent to about 2.5 weight percent bromine is preferred.

The following reference provide additional information relating to the preparation of such halogenated copolymers: (i) "A New Isobutylene Copolymer: Non-tire Uses", D. Kruse and J. V. Fuscon, *Rubber & Plastics News*, Feb. 1, 1993.

Such a halogenated copolymer may, for example, have the following physical characteristics: Mooney viscosity, ML(1+8) at 125° C. in a range of about 35° C. to about 60° and a Tg in a range of about −50° to about −60° C.

Typically, the halogen for such halogenation is bromine. Thus, typically the halogenated copolymer is a brominated copolymer of isobutylene and p-methyl styrene.

The term "phr" as used herein, and according to conventional practice, refers to "parts by weight of a respective material per 100 parts by weight of rubber, or elastomer."

The amount of trivalent phosphorous compound-silica complex that is added to the rubber may vary widely depending on the type of rubber and other compounds present in the vulcanizable composition. Generally, the amount of trivalent phosphorous compound-silica complex is used in a range of from about 1 to about 150 phr, with a range of 5 to about 80 phr being preferred. The trivalent phosphorous compound-silica complex may be added to the nonproductive or productive mix stage but is preferably added in the nonproductive stage.

The trivalent phosphorous compound may be a phosphite, phosphine or mixtures thereof Representative examples of phosphite compounds include those of the formula:

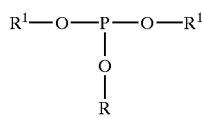

wherein each $R^1$ are independently selected from the group of hydrogen, alkyls having from 1 to 18 carbon atoms, aryls and arylalkyls having 6 to 15 carbon atoms. Preferably, each $R^1$ is an alkyl having 8 carbon atoms.

Examples of commercially available liquid phosphites of the above formula are triisodecyl phosphite, trilouryl phosphite, tris(tridecyl) phosphite, diphenyl isooctyl phosphite, diphenyl isodecyl phosphite, phenyl dissodecyl phosphite, triphenyl phosphite and trisnonylphenyl.

Examples of commercially available solid phosphites which may be used include tris (2,4-di-t-butylphenyl) phosphite, distearyl pentaerythritol diphosphite, bis (2,4-di-t-butylphenyl) pentaerythritol diphosphite, bis (2,6-di-t-butyle-4-methylphenyl) peniaerythritol diphosphite, bis (2,4-dicumylphenyl) pentaerythritol diphosphite and bis 2,4,6-tri-t-butylphenyl 2-butyl-2-ethyl-1,3 propanediol phosphite and mixtures thereof Representative examples of phosphine compounds are of the formula:

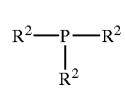

wherein $R^2$ is independently selected from the group consisting of halogens, alkyls having from 1 to 18 carbon atoms, aryls and arylalkyls having from 6 to 10 carbon atoms, amino, aikylamnino having from 1 to 10 carbon atoms, sulfur, and alkylmercaptans having from 1 to 10 carbon atoms.

The commonly employed particulate precipitated silicas used in rubber compounding applications can be used as the silica in the trivalent phosphorous compound-silica complex in this invention. The siliceous pigments or silica preferably employed in this invention are precipitated silicas which are obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica for use in the trivalent phosphorous compound-silica complex may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in the silica trivalent phosphorous compound complex such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Prior to preparing the trivalent phosphorous compound-silica complex by treating the silica with the dispersion of the trivalent phosphorous compound and solvent, one may heat the silica under a nitrogen atmosphere to decrease the presence of any moisture on the silica. For example, one may heat the silica at temperatures above 100° C. for periods of 24 hours and beyond.

The trivalent phosphorous compound-silica complexes for use in the present invention may be prepared by treating the above silica with neat or the trivalent phosphorous compound optionally dispersed in an organic solvent to form a treated trivalent phosphorous compound-silica complex. Representative examples of suitable solvents include chloroform, dichloromethane, carbon tetrachloride, hexane, heptane, cyclohexane, xylene, benzene and toluene. Preferably, the solvent is hexane. The concentration of the trivalent phosphorous compound in the organic solvent may vary. For example, the concentration of the trivalent phosphorous compound may range from 0.1 percent to 100 percent by weight (neat). When the trivalent phosphorous compound is applied neat, it may be done in a vapor phase or liquid phase. Preferably, the concentration of the trivalent phosphorous compound will range from 0.2 percent to 10 percent by weight.

The silica may be treated by contacting the silica with the dispersion of the trivalent phosphorous compound and solvent. Depending on the volume of each, one may even soak the silica in the dispersion of the trivalent phosphorous compound. The duration of the treatment may vary depending on the concentration of the dispersion and the amount of the trivalent phosphorous compound-silica derived from the trivalent phosphorous compound that is desired. Typically, a period of from instantaneous to several hours is sufficient. The treated silica is then removed from the solvent, if used. Such a separation step may be accomplished by well known means such as filtration, drying the pre-treated silica with heat and vacuum and the like.

As used herein, the term "trivalent phosphorous compound-silica complex" is intended to mean the product resulting from treating silica with a trivalent phosphorous compound. The percent by weight of the trivalent phosphorous compound-silica that is derived from the trivalent phosphorous compound may vary. For example, from 0.5 to 25 percent by weight of the total weight of the trivalent phosphorous compound-silica complex may be derived from the trivalent phosphorous compound that is complexed with the silica and/or supported into the silica. Preferably, from 5 to 15 percent by weight of the trivalent phosphorous compound-silica complex is derived from the trivalent phosphorous compound.

In addition to the silica in the trivalent phosphorous compound-silica complex, untreated silica (namely, not existing in the form of a trivalent phosphorous compound-silica complex or treated with the trivalent phosphorous compound) may be used in the composition of the present invention. For example, any of the above precipitated silica described above for use in making the trivalent phosphorous compound-silica complexes may be used in their untreated form. Conventionally, such silicas are used in an amount ranging from 10 to 150 phr. Preferably, such silicas are used in an amount ranging from 10 to 80 phr.

In addition to the trivalent phosphorous compound-silica complex, the processing of such composition may be optionally conducted in the presence of a sulfur containing organosilicon compound. Examples of suitable sulfur containing organosilicon compounds are of the formula:

Z-Alk-S$_n$-Alk-Z    (III)

in which Z is selected from the group consisting of

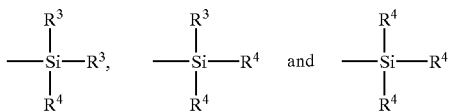

where $R^3$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclohexoxysilylpropyl) tetrasulfide, 3,3 '-bis(tricyclopentoxysilylpropyl) trisulfide, 2,2'-bis(tri-2-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 33,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec.butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,1 8'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur containing organosilicon compounds are the 3,3'-bis(trimethoxy or triethoxy silylpropyl) sulfides. The most preferred compound is 3,3'-bis(triethoxysilylpropyl) tetrasulfide. Therefore as to Formula III, preferably Z is

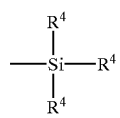

where $R^4$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the sulfur containing organosilicon compound of Formula III in a rubber composition will vary depending on the level of trivalent phosphorous compound-silica silica complex that is used. Generally speaking, the amount of the compound of Formula III, if used, will range from 1 to 10 phr. Preferably, the amount will range from 1.5 to 6 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts.

Representative examples of sulfur donors include elemental sulfur (free sulfur), an amine disulfide, polymeric polysulfide and sulfur olefin adducts. Preferably, the sulfur vulcanizing agent is elemental sulfiir. The sulfur vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

In one aspect of the present invention, the rubber composition is then sulfur-cured or vulcanized.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The rubber compositions of the present invention may contain a methylene donor and a methylene acceptor. The term "methylene donor" is intended to mean a compound capable of reacting with a methylene acceptor (such as resorcinol or its equivalent containing a present hydroxyl group) and generate the resin in-situ. Examples of methylene donors which are suitable for use in the present invention include hexamethylenetetramine, hexaethoxymethylmelamine, hexamethoxymethylmelamine, lauryloxymethylpyridinium chloride, ethoxymethylpyridinium chloride, trioxan hexamethoxymethylmelamine, the hydroxy groups of which may be esterified or partly esterified, and polymers of formaldehyde such as paraformaldehyde. In addition, the methylene donors may be N-substituted oxymethylmelamines, of the general formula:

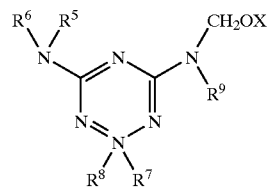

wherein X is an alkyl having from 1 to 8 carbon atoms, $R^5$, $R^6$, $R^7$, $R^8$ and $R^9$ are individually selected from the group consisting of hydrogen, an alkyl having from 1 to 8 carbon atoms and the group —CH2OX. Specific methylene donors include hexakis-(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris(methoxymethyl)melamine and N,N'N"-tributyl-N,N', N"-trimethylol-melamine. The N-methylol derivatives of melamine are prepared by known methods.

The amount of methylene donor and methylene acceptor that is present in the rubber stock may vary. Typically, the amount of methylene donor and methylene acceptor that each is present will range from about 0.1 phr to 10.0 phr. Preferably, the amount of methylene donor and methylene acceptor that each is present ranges from about 2.0 phr to 5.0 phr.

The weight ratio of methylene donor to the methylene acceptor may vary. Generally speaking, the weight ratio will range from about 1:10 to about 10:1. Preferably, the weight ratio ranges from about 1:3 to 3:1.

The mixing of the rubber composition can be accomplished by methods known to those having skill in the rubber mixing art; such as, on a mill, extruder or Banbury™. The ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber and trivalent phosphorous compound-silica complex are mixed in one or more non-productive mix stages. Optionally, untreated silica and/or carbon black is present. The terms "non-productive" and "productive" mix stages are well known to those having skill in the rubber mixing art. The rubber composition containing the trivalent phosphorous compound-silica complex is preferably subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 4 to 20 minutes.

Vulcanization of the rubber composition of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

Upon vulcanization, the rubber composition of this invention can be used for various purposes. For example, the sulfur vulcanized rubber composition may be in the form of a tire, belt or hose. In case of a tire, it can be used for various tire components. Such tires can be built, shaped, molded and cured by various methods which are known and will be readily apparent to those having skill in such art. Preferably, the rubber composition is used in the tread of a tire. As can be appreciated, the tire may be a passenger tire, aircraft tire, truck tire and the like. Preferably, the tire is a passenger tire. The tire may also be a radial or bias, with a radial tire being preferred.

The invention may be better understood by reference to the following examples in which the parts and percentages are by weight unless otherwise indicated.

The following examples are presented in order to illustrate but not limit the present invention.

Cure properties were determined using a Monsanto oscillating disc rheometer which was operated at a temperature of 150° C. and at a frequency of 11 hertz. A description of oscillating disc rheometers can be found in the *Vanderbilt Rubber Handbook* edited by Robert O. Ohm (Norwalk Conn., R. T. Vanderbilt Company, Inc., 1990), Pages 554 through 557. The use of this cure meter and standardized values read from the curve are specified in ASTM D-2084. A typical cure curve obtained on an oscillating disc rheometer is shown on Page 555 of the 1990 edition of the *Vanderbilt Rubber Handbook*.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

The invention may be better understood by reference to the following examples in which the parts and percentages are by weight unless otherwise indicated.

EXAMPLE I

Preparation of Trivalent Phosphorous Compound-Silica Complex

Five hundred grams of Zeosil® 1165 MP silica were charged into a 4 liter beaker along with 100 grams of tris(2-ethylhexyl phosphite), 2.5 grams of 2,6 ditertiary butyl p-cresol and 256 grams of hexane. The slurry was stirred, followed by the removal of the hexane at 70° C. under reduced pressure in a vacuum oven.

The amount of the trivalent phosphorous compound of the overall trivalent phosphorus compound-silica complex was calculated to be 20 weight percent.

EXAMPLE II

Table 1 below show the basic rubber compound that was used in this Example. Rubber stocks were prepared in order to compare the effects of using the trivalent phosphorous compound silica complex prepared in Example 1 versus a control compound not containing such phosphorus compound silica complex but separately added silica.

The compounding procedures involved mixing at 60 RPM the non-productive ingredients until a rubber temperature of 160° C. was achieved, followed by reduction of RPMs to maintain a temperature of 160° C. for the same period of time. All productive stage mixing was for two minutes. The physical data for each sample is also in Table 2.

TABLE 1

|  | Control Sample 1 | Sample 2 |
|---|---|---|
| Non-productive |  |  |
| SBR[1] | 70 | 70 |
| Polybutadiene[2] | 30 | 30 |
| Carbon black | 5.5 | 5.5 |
| Zinc oxide | 3.5 | 3.5 |
| Aromatic oil | 28 | 28 |
| Wax | 3.5 | 3.5 |
| Stearic acid | 2 | 2 |
| Antidegradants | 2 | 2 |
| Silica[3] | 70 | 0 |
| Modified silica of Example 1[4] | 0 | 84 |
| Productive |  |  |
| Cyclobenzylsulfenamide | 1.7 | 1.7 |
| Diphenylguanidine | 2 | 2 |
| Sulfur | 1.4 | 1.4 |

[1]Solution polymerized styrene-butadiene copolymer elastomer containing about 12 percent and having a Tg of about −43° C., obtainable as Solflex ® 1216 from The Goodyear Tire & Rubber Company
[2]Cis 1,4-polybutadiene elastomer available as Budene ® 1207 from The Goodyear Tire & Rubber Company
[3]A silica obtained as Zeosil ™ 1165MP from Rhodia and, reportedly, having a BET surface area of about 165 and a DBP absorption value of about 260 to 280.
[4]As prepared in Example 1

TABLE 2

| Samples | Control 1 | 2 |
|---|---|---|
| Silica | 70 | 0 |
| Modified silica of Example 1 | 0 | 84 |
| Stress Strain 25° C./160° C. |  |  |
| 100% Modulus, (MPa) | 1.25 | 1.16 |
| 300% Modulus, (MPa) | 2.72 | 5.98 |
| M300/M100 | 2.18 | 5.15 |
| EL-Brk (%) | 979 | 342 |
| Rheometer 160° C. |  |  |
| Minimum torque (dNm) | 37.6 | 28 |
| Maximum torque (dNm) | 60 | 45 |
| Delta torque (dNm) | 22.4 | 17 |
| $T_{90}$ (minutes) | 37 | 32.5 |
| Rebound |  |  |
| RT | 41.5 | 46.7 |
| 100° C. | 49.7 | 58.7 |
| DIN abrasion (relative volume cc) | 275 | 125 |

The compounds containing the treated silica of the present invention (Sample 2) shows higher modulus ratio (M300/M100), higher rebound and better (lower) DIN brasion compared to Control Sample 1. These properties indicate improved energy construction, improved polymer-filler interaction, better tire fuel economy and longer wearing tires.

While certain representative embodiments and details have been shown for the purpose of illustrating the invention, it will be apparent to those skilled in this art that various changes and modifications may be made therein without departing from the spirit or scope of the invention.

What is claimed is:

1. A method of processing a rubber composition which comprises mixing
   (i) 100 parts by weight of at least one elastomer; with
   (ii) 1 to 150 phr of a trivalert phosphorous compound-silica complex;
   wherein said trivalent phosphorous compound is a compound of the formula (I) or (II):

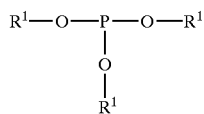

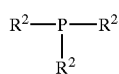

wherein each $R^1$ is independently selected from the group consisting of hydrogen, alkls, having from 1 to 18 carbon atoms, and aryls and arylalkyls having 6 to 15 carbon atoms; and
   wherein each $R^2$ is independently selected from the group consisting of halogens, alkys having from 1 to 18 carbon atoms, aryls and arylalkyls having form 6 to 10 carbon atom; amino alkylamino having from 1 to 10 carbon atoms, sulfur and alkylmercaptans.

2. The method of claim 1 wherein from 0.5 to 25 percent by weight of said trivalent phosphorous compound-silica complex is derived from a trivalent phosphorous compound.

3. The method of claim 2 wherein said silica is a precipitated silica.

4. The method of claim 1 wherein said trivalent phosphorous compound is a phosphite selected from the group consisting of tris (2,4-di-t-butylpbenyl) phosphine, distearyl pentaerythritol diphosphite, bis (2,4-di-t-butylphenyl) pentaerythritol diphosphite, bis (2,6-di-t-butyle-4-merthylphenyl) peniaerythritol diphosphite, bis (2,4-dicumylphenyl) pentaerythritol diphosphite, bis 2,4,6-tri-t-butylphenyl 2-butyl-2-ethyl-1,3 propanediol phosphite and mixtures thereof.

5. The method of claim 1 wherein said elastomer contains olefinic unsaturation and is selected from the group consisting of natural rubber, neoprene, polyisoprene, butyl rubber, polybutadiene, styrene-butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, EPDM and mixtures thereof.

6. The method of claim 1 wherein said elastomer is a brominated copolymer of isobutylene and p-methyl styrene containing about 0.5 to about 2.5 weight percent bromine and where its isobutylene/p-methyl styrene ratio is in the range of about 50/1 to about 7/1.

7. The method of claim 1 wherein said rubber composition is thermomechanically mixed at a rubber temperature in a range of from 140° C. to 190° C. for a mixing time of from 4 to 20 minutes.

8. A rubber composition comprising an intimate mixture of
   (i) 100 parts by weight of at least one elastomer; with
   (ii) 1 to 150 phr of a trivalent phosphorous compound-silica complex;
   wherein said trivalent phosphorous compound is a compound of the formula (I) or (II):

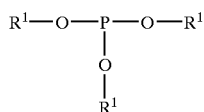

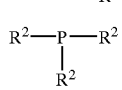

wherein each $R^1$ is independently selected from the group consisting of hydrogen, alkyls, having from 1 to 18 carbon atoms and aryls and arylalkyls having 6 to 15 carbon atoms; and
   wherein each $R^2$ is independently selected from the group consisting of halogens, alkyls having from 1 to 18 carbon atoms, aryls and arylalkyls having from 6 to 10 carbon atoms, amino akylamino having from 1 to 10 carbon atoms, sulfur and alkylmercaptans.

9. The composition of claim 8 wherein from 0.5 to 25 percent by weight of said trivalent phosphorous compound-silica complex is derived from a trivalent phosphorous compound.

10. The composition of claim 8 wherein said silica is a precipitated silica.

11. The composition of claim 8 wherein said trivalent phosphorous compound is a phosphite selected from the group consisting of tris (2,4-di-t-butylphenyl) phosphine, distearyl pentaerythritol diphosphite, bis (2,4-di-t-butylphenyl) pentaerythritol diphosphite, bis (2,6-di-t-butyle-4-merthylphenyl) penlaerythritol diphosphite, bis (2,4-dicumylphenyl) pentaerythritol diphosphite, bis 2,4,6-tri-t-butylphenyl 2-butyl-2-ethyl-1,3 propanediol phosphite and mixtures thereof.

12. The composition of claim 8 wherein said elastomer containing olefinic unsaturation is selected from the group consisting of natural rubber, neoprene, polyisoprene, butyl rubber, polybutadiene, styrene-butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, EPDM and mixtures thereof.

13. The composition of claim 8 wherein said elastomer is a brominated copolymer of isobutylene and p-methyl styrene containing about 0.5 to about 2.5 weight percent bromine and where its isobutylene/p-methyl styrene ratio is in the range of about 50/1 to about 7/1.

14. A sulfur vulcanized rubber composition which is prepared by heating the composition of claim 8 to a temperature ranging from 100° C. to 200° C. in the presence of a sulfur vulcanizing agent.

15. The sulfur vulcanized rubber composition of claim 14 in the form of a tire, belt or hose.

16. A tire having a tread comprised of the composition of claim 15.

* * * * *

UNITED STATES PATENT AND TRADEMARK OFFICE
CERTIFICATE OF CORRECTION

PATENT NO. : 6,441,070 B1
DATED : August 26, 2002
INVENTOR(S) : Adel Farhan Halasa et al.

It is certified that error appears in the above-identified patent and that said Letters Patent is hereby corrected as shown below:

Column 3,
Line 54, delete "trilouryl" and substitute -- trilauryl -- therefore
Line 62, delete "(2,6-di-t-butyle-4-methylphenyl)" and substitute
-- (2,6-di-t-butyl-4-methylphenyl) -- therefore
Line 62, delete "peniaerythritol" and substitute -- pentaerythritol -- therefore Column 11,
Line 24, delete "alkls" and substitute -- alkyls -- therefore
Line 28, delete "alkys" and substitute -- alkyls -- therefore
Line 39, delete "(2,4-di-t-butylpbenyl)" and substitute
-- (2,4-di-t-butylphenyl) -- therefore
Lines 41 and 42, delete "(2,6-di-t-butyle-4-merthylphenyl)" and substitute
-- (2,6-di-t-butyl-4-methylphenyl) -- therefore
Line 42, delete "peniaerythritol" and substitute -- pentaerythritol -- therefore Column 12,
Line 37, delete "(2,6-di-t-butyle-4-merthylphenyl)" and substitute
-- (2,6-di-t-butyl-4-methylphenyl) -- therefor
Line 37, delete "peniaerythritol" and substitute -- pentaerythritol -- therefore Signed and Sealed this Eleventh Day of February, 2003

JAMES E. ROGAN
*Director of the United States Patent and Trademark Office*